March 22, 1966 C. S. MERTLER ETAL 3,241,370
THERMAL PROBE

Filed Sept. 21, 1962 2 Sheets-Sheet 1

INVENTORS
CHARLES S. MERTLER
BY LaVERNE G. SMITH

Woodling, Krost,
Granger and Rust
ATTORNEYS

March 22, 1966    C. S. MERTLER ETAL    3,241,370
THERMAL PROBE
Filed Sept. 21, 1962        2 Sheets-Sheet 2
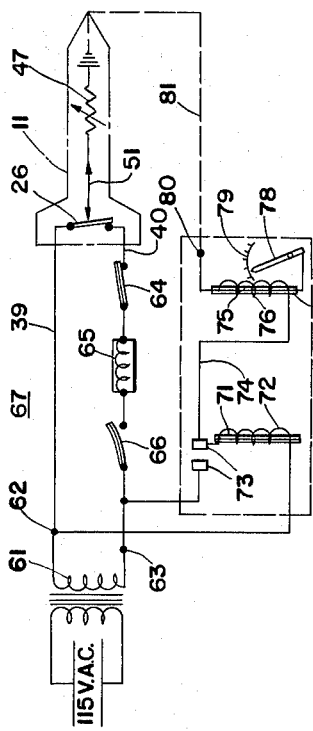
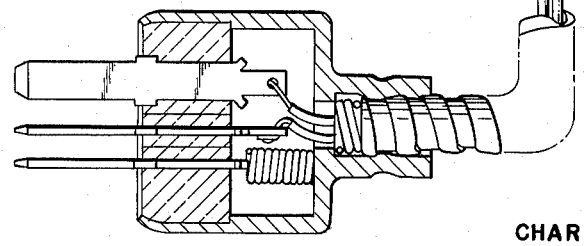
INVENTORS
CHARLES S. MERTLER
BY LaVERNE G. SMITH
*Woodling, Krost,
Granger and Rust*
ATTORNEYS United States Patent Office 3,241,370
Patented Mar. 22, 1966

3,241,370
THERMAL PROBE
Charles S. Mertler, Mansfield, and La Verne G. Smith, Lexington, Ohio, assignors to Stevens Manufacturing Company, Inc., a corporation of Ohio
Filed Sept. 21, 1962, Ser. No. 225,335
13 Claims. (Cl. 73—352)

The invention relates in general to thermal probes and more particularly to a temperature sensitive probe which may be used to control and indicate the temperature of an object such as food products.

Various types of thermal probes have been used, such as pointed probes to be inserted in a roast of meat for example, or for insertion in a liquid to be cooked or otherwise heated, and the present invention may be utilized in such applications.

The thermal probe of the present invention may generally comprise an elongated hollow conductive body with a switch located at one end of this body, inner conductive means in said body having a different thermal coefficient of expansion therefrom and having an impedance variable with the temperature. The switch is mounted for mechanical actuation by the body and the inner conductive means in accordance with the different thermal coefficients of expansion thereof, a first circuit includes the switch and a second circuit includes the temperature variable impedance, the body and inner conductive means.

An object of the invention is to provide a temperature sensitive probe which may be used simultaneously with two different circuits.

Another object of the invention is to provide a thermal probe with both control and indicator means.

Another object of the invention is to provide a thermal probe with an electrical switch and with a temperature sensitive impedance with the switch and the impedance in two different circuits, one of which may be a control circuit and the other an indicator circuit.

Another object of the invention is to provide a thermal probe with an elongated body which may be inserted or pressed into a food product to control the cooking temperature for the food product and also indicate the actual temperature thereof.

Another object of the invention is to provide a thermal probe with first and second independent circuits having a common conductive means in the probe.

Another object of the invention is to provide a thermal probe with a hollow tube and an inner conductive means, wherein the inner conductive means provides two different functions, one a mechanical function of actuating a switch, and the other an electrical function of providing a variable impedance for a separate circuit.

Other objects and a fuller understanding of this invention may be had by referring to the following description and claims, taken in conjunction with the accompanying drawings, in which:

FIGURE 3 is a schematic diagram of the circuits usable with the thermal probe of FIGURE 1; and, FIGURE 4 is a partial view of a modification.

Figure 1:
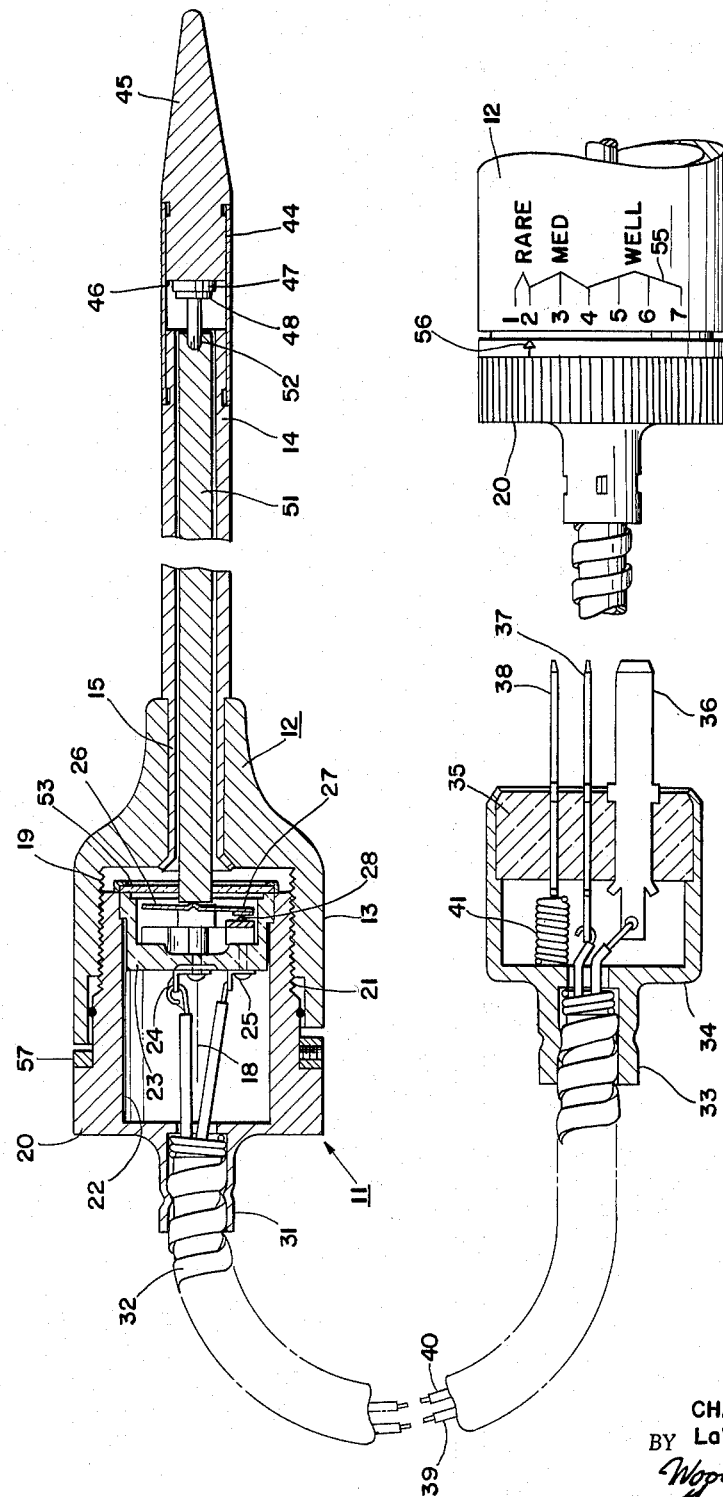
FIGURE 1 is a longitudinal sectional view of a thermal probe embodying the invention.
Figure 2:
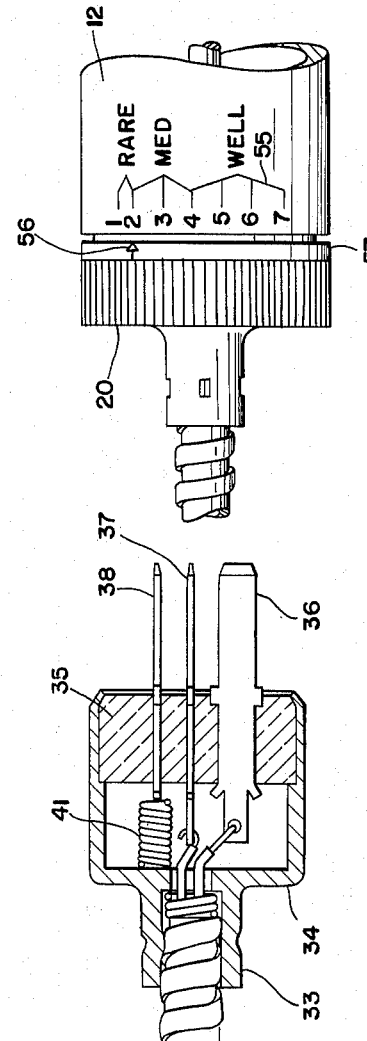
FIGURE 2 is a partial external view of the head of the probe.

The FIGURES 1 and 2 show the thermal probe 11 which is the preferred embodiment of the invention, but is merely illustrative of one form which the invention may take. The probe 11 includes generally a body 12 which in turn includes a base 13 and a hollow tube 14. The base 13 is preferably of metal such as aluminum and the hollow tube 14 is also preferably of aluminum. The tube 14 has an inner end 15 fixed within the base 13 such as by press fitting and an adhesive, and also by staking. The hollow tube has been shown as broken away but may be several inches long to be of a convenient length to be inserted in a roast of meat or to be inserted in a cooking vessel of any desired size. The base 13 and the tube 14 have an axis 18 and the base 13 is hollow with a female thread 19 coaxial at one end thereof. A dial head 20, preferably of metal, has male threads 21 threaded in the female threads 19. A recess 22 is provided within the dial head 20 and an insulator switch base 23 is mounted in the recess 22. The switch base 23 has first and second terminals 24 and 25 mounted thereon. A movable switch blade 26 is fixed on the switch base 23 and electrically connected to the first terminal 24. This switch blade 26 carries a first contact 27 for cooperation with a second fixed contact 28 electrically connected to the second terminal 25.

The outer end of the dial head 20 has a conduit opening 31 electrically and mechanically connected to a flexible metal sheath 32. The other end of this sheath 32 is mechanically and electrically connected to the metal body 33 of a terminal plug 34. This terminal plug 34 carries an insulator 35 in turn mounting first, second and third contact blades 36, 37 and 38, respectively. The metal sheath 32 houses first and second conductors 39 and 40, respectively. The first conductor 39 is connected to the first contact blade 36 and to the first terminal 24. The second conductor 40 is connected to the second contact blade 37 and the second terminal 25. The third contact blade 38 is connected through a compression spring 41 to the metal body 33 of the plug 34 and thus is grounded thereto and to the metal sheath 32. This in turn is grounded to the metal dial head 20 and to the metal body 12 of the probe 11.

The hollow tube 14 of the body 12 extends coaxially from the right end of the base 13, as shown in FIGURE 1. The outer end of this hollow tube 14 carries a hollow heat trap tube 44. This heat trap tube may be made of some metal of relatively poorer heat conductivity than the aluminum of which tube 14 is preferably made. This heat trap tube 44 may be made of stainless steel, for example, and may be fixedly secured to the outer end of the tube 14 as by press fitting and an adhesive, plus staking if desired. A pointed metal tip 45 is shown as being provided on the outer end of the heat trap tube 44. This pointed tip permits the probe 11 to be more readily inserted in solid food products such as a roast of meat. The metal tip 45 is preferably made of metal of good heat conductivity such as aluminum or copper, and may be fixedly secured to the heat trap tube 44 in any convenient manner, such as by silver soldering.

The metal tip 45 provides a closed end on the hollow tube 14 and has a flat inner surface 46. A temperature sensitive impedance such as a thermistor 47 has two opposing flat surfaces, one of which engages the inner surface 46. A metal contactor button 48 engages the other face of the thermistor 47. Preferably the thermistor 47 is fixed in place as by silver soldering to both the inner surface 46 and to the contactor button 48. Alternatively, this may be low temperature solder, possibly with a high silver content.

An inner member 51 is shown as a metal rod and is disposed within the hollow tube 14. This inner member 51 extends between the contactor button 48 and the movable switch blade 26. This inner member or metal rod 51 is insulated from the metal tube 14 and this may be accomplished by a sleeve of insulation or, as shown, may be accomplished by coaxially spacing the rod 51 from the metal tube 14. This may be accomplished by a socket 52 at the outer end of the metal rod 51 engaging the contractor button 48 and at the other end by an insulator washer 53 fixed to the switch base 23. The inner member 51 is made of a material having a different thermal coefficient of expansion from that of the outer hollow tube 14. With the tube 14 preferably constructed of aluminum, the inner member 51 may conveniently be made from Invar or other metal having a low thermal coefficient of expansion.

The different thermal coefficients of expansion of the tube 14 and rod 51 will provide mechanical actuation for the switch contacts 27 and 28, because the rod 51 abuts the movable switch blade 26. Also, the electrical conductivity of the metal tube 14 and the inner rod 51 will provide a series conductive path from the body 12 through the thermistor 47 to the movable switch blade 26.

The thermal probe 11 has been made adjustable to adjust the temperature of opening and closing of switch contacts 27 and 28. This adjustment may be accomplished by rotation of the dial head 20 relative to the body 12. The body 12 may carry indicia 55, FIGURE 2, for cooperation with an index mark 56 on the dial head 20. A lock ring 57 may limit the rotational movements of the dial head 20 relative to the body 12. This relative adjustment adjusts the position of the dial head 20 relative to the inner end of the rod 51 and thus adjusts the opening and closing temperatures of the switch contacts 27 and 28.

FIGURE 3 shows schematically a circuit diagram of the circuits usable with the thermal probe 11. A transformer secondary 61 may be used to supply a low voltage to the probe 11 in the interest of safety. The terminal plug 34 would be received in a suitable socket to make electrical connection to the circuit. The secondary 61 may have first and second terminals 62 and 63, and the first contact blade 36 and, hence, the first conductor 39 is connected to the first terminal 62. The second contact blade 37 and the second conductor 40 are connected through a normally closed high limit thermal switch 64 to a gas valve or other energy controller 65. The other side of this gas valve controller is connected through a pilot flame switch 66 to the terminal 63. The above described parts complete a first circuit 67 which may be a control circuit to control the gas valve controller 65. This may, in turn, control in any well known manner the gas flame in an oven or range burner to control the heat applied to a food product in which the probe 11 is immersed. The FIGURE 3 also shows a second circuit 68 which may be an indicator circuit. A voltage regulator 71 may optionally be used and is shown as including an operating coil 72 controlling contacts 73 and connected in series across the terminals 62 and 63. The voltage regulator 71 supplies a substantially constant average voltage on a conductor 74 to an indicator 75 which includes an operating coil 76 and a bimetal 77 connected to actuate an indicator needle 78 cooperating with indicia 79. The other end of the operating coil 76 connected to a terminal 80 which is connected to ground. The FIGURE 3 shows this ground connection as a dotted line 81 and as connected to the body of probe 11. This conductor 81 is preferably an insulated conductor, although it may be the frame of the gas range with which the circuit is used. This ground circuit extends through the third contact blade 38 of the terminal plug 34, as shown in FIGURE 1. Thus, this ground circuit extends through the outer metal sheath 32 and the external metal parts of the probe body 12. The second circuit 68 thus includes the first conductor 39 from the terminal 62 through the movable switch blade 26 and the inner rod 51 to the thermistor 47 and, thus, to the ground circuit to be connected to the terminal 80 of the indicator 75 and through the voltage regulator contacts 73 to the other terminal 63 of the transformer. The probe 11 has been shown with normally closed contacts 27 and 28, but these may be normally open contacts, upon a suitable change in control circuitry.

In operation, the thermal probe is adjusted to close the contacts 27 and 28 at room temperature. Upon heat applied to the hollow tube 14 of the probe 11, the aluminum tube 14 will expand and the inner member 51 will undergo practically no expansion to thus open the contacts 27 and 28 as the adjusted temperature.

Thus, the switch contacts 27 and 28 are in the first or control circuit 67. The pilot flame switch 66 may be used with a gas range and is a switch which is normally open at room temperature, however, when the pilot flame is properly operating this switch will be closed. The high limit switch 64 will normally be closed until subjected to an oven heat which is sufficient to cause the switch to open and disable the circuit 67. This thermal switch 64 may cycle to hold the oven at a preset value during the early stages of the cooking period. With the terminal plug 34 connected in a socket such as on the inside wall of the range oven, the probe 11 will be connected in the circuit. With the probe 11 inserted in a roast of meat within the oven, the closed switch contacts 27 and 28 will provide a control signal to energize the gas valve or energy controller 65 or relay to control electrical heat. This supplies heat to the oven. Initially, the roast will be cold so that the contacts 27 and 28 will be closed with considerable force. Also, initially the thermistor 47 will be cold to have a high initial impedance. Thus, the impedance in the second or control circuit 68 will be high and the current through the indicator 75 will be low. Accordingly, a low temperature will be indicated on the indicia 79.

As the roast heats, the thermistor 47 will decrease in impedance and the incerasing temperature will move the indicator needle 78 to show this increasing temperature. Also, as the roast heats, the aluminum tube 14 will heat and expand, and at some point the switch contacts 27 and 28 will open to open the control circuit 67 and thus shut off further heat to the oven. The control circuit 67 may cycle by the cycling of the contacts 27 and 28. As the roast approaches the desired temperature, the cycling will provide increased length of off periods relative to the on periods. The probe 11 provides a cetrain amount of anticipation by conductivity of heat along the metal tube 14 from the base end 13 since this base is exposed to the heat of the oven. The heat trap tube 44 limits the amount of heat conductivity form the metal tube 14 to the metal tip 45 and hence to the thermistor 47.

FIGURE 4 shows a modification wherein an additional heat trap tube 84 may be provided between the base 13A and the metal tube 14. This additional heat trap tube 84 limits conductive flow of heat from the base 13 to the metal tube 14 and thus limits the amount of anticipation. This prevents cycling of the switch contacts 27 and 28 too early in the cooking period.

The probe 11 provides a combination of two different circuit functions, one of which may be used in the control circuit 67 and the other of which may be used in the indicator circuit 68. The switch contacts 27 and 28 and the movable switch blade 26 are provided in the first circuit 67. The thermistor 47 is provided in the second circuit 68. The first conductor 39 is common to the two circuits and also the movable switch blade 26 is common to the two circuits. The inner member or inner rod 51 provides a dual function. It mechanically cooperates to actuate the movable switch blade 26 in accordance with the different thermal coefficient of expansion between the metal tube 14 and the inner rod 51. Also, this inner rod 51 is in electrical engagement with the movable switch blade 26 and the thermistor 47 to thus provide a series circuit from the movable switch blade 26 through the thermostor 47 to the metal tube 14.

The hollow tube 14 being of metal is electrically conductive to be a part of the ground circuit. Also, this hollow tube 14 houses, in a hermetically sealed manner, inner conductive means. This inner conductive means includes the metal rod 51 and the thermistor 47 and has a different thermal coefficient of expansion from the hollow tube 14 and also has an impedance variable with temperature. Accordingly, this inner conductive means provides a dual function of mechanically actuating the switch in the control circuit 67 and also providing the temperature variable impedance in the indicator circuit 68.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A temperature control and indicator probe comprising, in combination, an elongated hollow conductive body,
    a switch located at one end of said body,
    inner rigid conductive means in said body having a different thermal coefficient of expansion therefrom and having an impedance variable with temperature,
    said switch being mounted for mechanical actuation by said body and said inner means in accordance with the different thermal coefficients of expansion thereof,
    a first circuit including said switch,
    a second circuit including said temperature variable impedance and said body and inner conductive means,
    common conductor means in said first and second circuits,
    and one of said circuits being a control circuit and the other being an indicator circuit,
    said inner conductive means being electrically and mechanically connected to said switch and to the opposite end of said body.

2. A temperature control and indicator probe comprising, in combination, an elongated body,
    said body comprising an outer conductive tube and an inner conductive member of substantially the same length and having different thermal coefficients of expansion,
    a switch located at one end of said body and mounted for mechanical actuation by said outer tube and said inner member in accordance with the different thermal coefficients of expansion thereof,
    a temperature sensitive impedance located near one end of said body and electrically connected to said outer tube and said inner member,
    a first circuit including said switch,
    a second circuit including said temperature responsive impedance and said outer tube and inner member,
    common conductor means in said first and second circuits,
    and one of said circuits being a control circuit and the other being an indicator circuit.

3. A temperature control and indicator probe comprising, in combination, an elongated body,
    a temperature sensitive resistor located near one end of said body,
    said body comprising an outer tube and an inner member having different thermal coefficients of expansion,
    a switch located at the opposite end of said body and actuable by said outer tube and said inner member in accordance with the different thermal coefficients of expansion thereof,
    first, second and third conductor means,
    a first circuit including said first and second conductor means and said switch,
    and a second circuit including said first and third conductor means and said outer tube and inner member connected to said temperature sensitive resistor.

4. A temperature control and indicator probe comprising, in combination, an elongated body,
    a temperature sensitive resistor located near one end of said body,
    said body comprising an outer tube and an inner member of substantially the same length and having different thermal coefficients of expansion,
    a switch located at the opposite end of said body and actuable by said outer tube and said inner member in accordance with the different thermal coefficients of expansion thereof,
    first, second and third conductor means,
    control means including said first and second conductor means and including said switch,
    and indicator means including said temperature responsive resistor and said outer tube and inner member and said first and third conductor means to provide a complete electrical circuit through said resistor.

5. A thermal probe, comprising, in combination a body having a base,
    a switch mounted on said base and having a movable switch blade,
    a tube as part of said body and extending from one end of said base,
    a closed end on said tube,
    an inner rigid member within said tube of substantially the same length,
    said tube and said inner member having different thermal coefficients of expansion,
    means providing mechanical engagement between said inner member and said closed end to actuate said movable switch blade,
    means providing longitudinal conductivity along said tube and inner member,
    a temperature sensitive impedance electrically connected in series with said tube and inner member,
    a first circuit including said switch,
    a second circuit including said tube and inner member and said impedance,
    and common conductor means in said first and second circuits.

6. A thermal probe, comprising, in combination, a body having a base,
    a switch having a movable switch blade and mounted on said base,
    a conductive tube having a closed end end extending from one end of said base as part of said body,
    an inner surface on said closed end,
    a temperature sensitive impedance having two opposite faces with one thereof engaging said inner surface,
    a conductive rod disposed in insulated relation within said conductive tube and having one end of said rod electrically and mechanically engaging the other face of said impedance and having the other end of said rod engaging said movable switch blade,
    said conductive tube and said conductive rod having different thermal coefficients of expansion to actuate said movable switch blade,
    a first circuit including said movable switch blade,
    and a second circuit including said movable switch blade, said conductive tube and rod and said impedance.

7. A thermal probe, comprising, in combination, a body having a base,
    a movable switch blade mounted on said base,
    a first contact carried on said movable switch blade and a second contact carried on said base,
    a metal tube extending from one end of said base as part of said body,
    a closed metal end carried on the outer end of said metal tube,
    an inner surface on said closed end,
    a temperature sensitive impedance having two opposite faces with one thereof engaging said inner surface,
    a metal rod disposed in insulated relation within said metal tube and having one end of said rod electrically and mechanically engaging the other face of said impedance and having the other end of said rod engaging said movable switch blade, said metal tube and said metal rod having different thermal coefficients of expansion to actuate said movable switch blade, a first circuit including said movable switch blade and said first and second contacts, and a second circuit including said movable switch blade, said metal rod and said impedance.

8. A thermal probe, comprising, in combination, a body having a base, a recess within said base, a movable switch blade insulatedly mounted on said recess, a first contact carried on said movable switch blade and a second contact carried on said base, a metal tube extending from one end of said base as part of said body, a pointed metal tip of good heat conductivity carried on the outer end of said metal tube, an inner surface on the inner end of said pointed metal tip, a temperature sensitive impedance having two opposite faces with one thereof engaging said inner surface, a metal rod disposed in insulated relation within said metal tube and having one end of said rod electrically connected to the other face of said impedance and having the other end of said rod engaging said movable switch blade, said metal tube and said metal rod having different thermal coefficients of expansion to actuate said movable switch blade, a first circuit including said movable switch blade and said first and second contacts, and a second circuit including said movable switch blade, said metal rod and said impedance.

9. A combined control and indicator probe, comprising, in combination, a metal base, a recess within said base, an insulator switch base mounted within said recess, a movable switch blade mounted on said switch base, a first contact carried on said movable switch blade and a second contact carried on said base, a metal tube extending from one end of said base, a heat trap tube of metal of poorer heat conductivity than said metal tube and fixed to the outer end of said metal tube, a pointed metal tip of good heat conductivity carried on the outer end of said heat trap tube, an inner surface on the inner end of said pointed metal tip, a thermistor having one face engaging said inner surface, a contactor button engaging the opposite face of said thermistor, a metal rod having one end engaging said contactor button and having the other end engaging said movable switch blade and coaxially disposed in insulated relation within said metal tube, said metal tube and said metal rod having different thermal coefficients of expansion to actuate said movable switch blade, a first circuit including said movable switch blade and said first and second contacts, and a second circuit including said movable switch blade, said metal rod and said thermistor.

10. A combined control and indicator probe, comprising, in combination, a metal base, a recess within said base, an insulator switch base mounted within said recess, a movable switch blade mounted on said switch base, a first contact carried on said movable switch blade and a second contact carried on said base, a terminal plug, first, second and third contact blades carried in said terminal plug, first, second and third flexible conductors connected to said first, second and third contact blades and to said first and second contacts and metal base, respectively, a metal tube extending from one end of said base, a heat trap tube of metal of poorer heat conductivity than said metal tube and fixed to the outer end of said metal tube, a pointed metal tip of good heat conductivity carried on the outer end of said heat trap tube, a flat surface on the inner end of said pointed metal tip, a thermistor having one face fixed to said flat surface, a contactor button fixed to the opposite face of said thermistor, a metal rod having a socket on one end engaging said contactor button and having the other end engaging said movable switch blade and coaxially disposed in insulated spaced relation within said metal tube, said metal tube and said metal rod having different thermal coefficients of expansion to actuate said movable switch blade, a control circuit extending between said first and second contact blades and including said movable switch blade and said first and second contacts, and an electrical indicator circuit extending between said first and third contact blades and including said movable switch blade, said metal rod and said thermistor.

11. A combined control and indicator probe, comprising, in combination, a hollow metal base having an axis and having a female thread therein, a metal dial head having a male thread received in said female thread of said metal base, a recess within said dial head, an insulator switch base mounted within said recess, first and second terminals on said switch base, a movable switch blade connected to said first terminal, first and second contacts electrically connected to said first and second terminals, respectively, with said first contact carried on said movable switch blade, a metal tube extending from one end of said base opposite said metal sheath, a pointed metal tip of good heat conductivity fixedly carried on the outer end of said metal tube, a flat surface on the inner end of said pointed metal tip, a thermistor having two opposite surfaces with one thereof soldered to said flat surface, a contactor button soldered to the other surface of said thermistor, a metal rod having a socket on one end engaging said contactor button and having the other end engaging said movable switch blade and coaxially disposed in insulated spaced relation within said metal tube, said metal tube and said metal rod having different thermal coefficients of expansion to actuate said movable switch blade, a control circuit extending between said first and second terminals and including said movable switch blade and first and second contacts, and an electrical indicator circuit being established from said first terminal through said movable switch blade, said metal rod, said thermistor, said pointed tip, said metal tube, and said metal base to said metal dial head.

12. A combined control and indicator probe, comprising, in combination, a hollow metal base having an axis and having a female thread therein, a metal dial head having a male thread received in said female thread of said metal base,
a recess within said dial head,
an insulator switch base mounted within said recess,
a movable switch blade mounted on said switch base,
a first contact carried on said movable switch blade and a second contact carried on said base,
a terminal plug,
first, second and third contact blades insulatedly carried in said terminal plug,
first and second flexible conductors connected to said first and second contacts and to said first and second contact blades, respectively, and completing a control circuit between said first and second contact blades,
a flexible metal sheath enveloping said conductors and electrically joined to said third contact blade and to said metal dial head,
a metal tube extending from one end of said base opposite said metal sheath,
a pointed metal tip of good heat conductivity fixedly carried on the outer end of said metal tube,
a flat surface on the inner end of said pointed metal tip,
a thermistor having two opposite surfaces with one thereof soldered to said flat surface,
a conductor button soldered to the other surface of said thermistor,
a metal rod having a socket on one end engaging said contactor button and having the other end engaging said movable switch blade and coaxially disposed in insulated spaced relation within said metal tube,
said metal tube and said metal rod having different thermal coefficients of expansion to actuate said movable switch blade,
and an electrical indicator circuit being established from said first contact blade through said first conductor, said movable switch blade, said metal rod, said thermistor, said pointed tip, said metal tube, and said metal sheath to said third contact blade.

13. A combined control and indicator probe, comprising, in combination, a hollow metal base having an axis and having a female thread therein,
a metal dial head having a male thread received in said female thread of said metal base,
a recess within said dial head,
a ceramic switch base mounted within said recess,
first and second terminals on said switch base,
a movable switch blade connected to said first terminal, first and second contacts electrically connected to said first and second terminals, respectively, with said first contact carried on said movable switch blade,
a terminal plug having a metal body,
first, second and third contact blades insulatedly carried in said plug body,
first and second flexible conductors connected to said first and second terminals and to said first and second contact blades, respectively, and completing a control circuit between said first and second contact blades,
a flexible metal sheath enveloping said conductors and physically and electrically joined to said metal plug body and to said metal dial head,
means connecting said third contact blade to said metal plug body,
an aluminum tube extending from one end of said base opposite said metal sheath,
a stainless steel heat trap tube fixed to the outer end of said aluminum tube,
a pointed metal tip of good heat conductivity fixed on the outer end of said heat trap tube,
a flat surface on the inner end of said pointed metal tip,
a thermistor having two opposite surfaces with one thereof soldered to said flat surface,
a contactor button soldered to the other surface of said thermistor,
an Invar rod having a socket on one end engaging said contactor button and having the other end engaging said movable switch blade and coaxially disposed in insulated spaced relation within said aluminum tube,
and an electrical indicator circuit being established from said first contact blade through said first conductor, said movable switch blade, said Invar rod, said thermistor, said pointed tip, said heat trap tube, said aluminum tube, and said metal sheath to said third contact blade.

References Cited by the Examiner
UNITED STATES PATENTS

| | | |
|---|---|---|
| 1,794,531 | 3/1931 | Newell. |
| 2,705,747 | 4/1955 | Strange _____ 73—362.3 X |
| 2,858,699 | 11/1958 | Scofield et al. _____ 73—362 X |
| 2,962,898 | 12/1960 | Burling et al. _____ 73—362.3 |
| 3,029,329 | 4/1962 | Bolesky _____ 200—137.2 |

LOUIS R. PRINCE, *Primary Examiner.*

ISAAC LISANN, *Examiner.*